United States Patent Office 3,462,518
Patented Aug. 19, 1969

3,462,518
OXYALKYLATED CYCLIC POLYMERIC BIS(HYDROXYPHENOXY)PHOSPHONITRILES
Ehrenfried H. Kober, Hamden, Henry F. Lederle, North Haven, and Gerhard F. Ottmann, Hamden, Conn., assignors to Olin Mathieson Chemical Corporation, a corporation of Virginia
No Drawing. Filed Nov. 15, 1965, Ser. No. 507,679
Int. Cl. C07d 105/02; C07f 9/08; C10m 3/40
U.S. Cl. 260—927          5 Claims

ABSTRACT OF THE DISCLOSURE

Cyclic polymeric bis(hydroxyphenoxy) phosphonitriles are reacted with an alkylene oxide or a hydroxy alkylene oxide in a suitable solvent at a temperature of from about 80° to about 200° C. and in the presence of an alkaline catalyst to yield oxyalkylated products useful as base stock fluids for the preparation of valuable water-base hydraulic fluids.

---

This invention relates to novel cyclic polymeric phosphonitrilic compounds. More particularly this invention relates to cyclic polymeric hydroxyphenoxy phosphonitriles and oxyalkylation products prepared therefrom with an alkylene oxide or a hydroxyalkylene oxide.

The novel cyclic polymeric hydroxyphenoxy phosphonitriles of this invention have the formula:

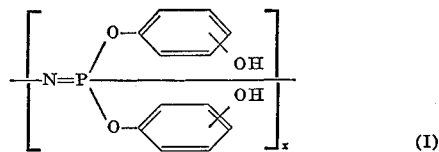
(I)

wherein $x$ is an integer of from 3 to 7.

In preparing the novel cyclic polymeric hydroxyphenoxy phosphonitriles of this invention, cyclic polymeric bis(methoxyphenoxy)phosphonitriles having the formula:

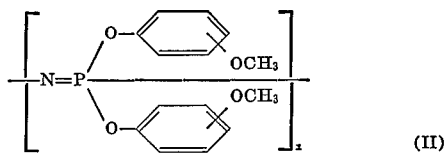
(II)

wherein $x$ is an integer of from 3 to 7, are reacted with hydrogen bromide. Compounds of type II can be prepared by the method of Fitzsimmons and Shaw (J. Chem. Soc. 1964, p. 1735). For example, trimeric bis(p-methoxyphenoxy)phosphonitrile can be synthesized by reacting trimeric phosphonitrilic chloride (NPCl$_2$)$_3$, with methoxyphenol in the presence of sodium hydroxide.

Cleavage of the alkoxy group is preferably conducted with concentrated hydrobromic acid (30 to about 60 percent by weight), using glacial acetic acid as a solvent, at reflux temperature.

In carrying out the oxyalkylation reaction, the cyclic polymeric bis(hydroxyphenoxy)phosphonitrile of Formula I, dissolved in a suitable solvent, is reacted with an alkylene oxide or a hydroxyalkylene oxide at a temperature of from about 80 to about 220° and in the presence of an alkaline catalyst, such as potassium hydroxide, sodium hydroxide; an alkali metal oxide, such as sodium methoxide, sodium ethoxide or potassium tert. butoxide, etc. Suitable alkylene oxides and hydroxyalkylene oxides include, for example, ethylene oxide, propylene oxide, butylene oxide, glycidol and mixtures thereof. Generally, from about 1 mole to about 40 moles or more of the alkylene oxide or hydroxyalkylene oxide are reacted with each —OH group present in the hydroxyphenoxy phosphonitrile starting material.

The novel oxyalkylated products of this invention, prepared by reacting a compound of Formula I with an alkylene oxide or hydroxyalkylene oxide, have the formula:

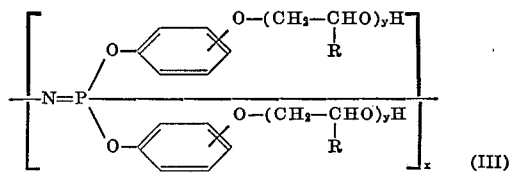
(III)

wherein $x$ is an integer of from 3 to 7, $y$ is an integer of from about 1 to about 40 and R is H, CH$_3$, CH$_3$—CH$_2$ or CH$_2$—OH.

Various embodiments of this invention are illustrated in the following examples which are to be considered not limitative.

EXAMPLE I

Trimeric bis(p-hydroxyphenoxy)phosphonitrile

A three liter, three neck flask, equipped with a mechanical stirrer, azeotrope trap, reflux condenser and dropping funnel, was charged with 186.2 g. (1.5 moles) of p-methoxyphenol, 93.5 g. of potassium hydroxide, and 1000 ml. of xylene. Heating and stirring were started and when a temperature of approximately 80° C. had been reached, 69.5 g. (0.2 mole) of trimeric phosphonitrilic chloride, dissolved in 250 ml. of xylene, was added via the dropping funnel. The addition of the trimeric phosphonitrilic chloride required twenty-five minutes during which time azeotroping commenced. After a total of 36 ml. of water had been recovered in the azeotrope trap, refluxing was continued for 17.5 hours.

The cooled product was first extracted with 10 percent aqueous potassium hydroxide and then with water. The washed product was stripped to 170° C. bottoms temperature at atmospheric pressure, following which the temperature was raised to 190° C. at 10–20 mm., and finally to 160° C. at 1 mm. overnight. The crude trimeric bis(p-methoxyphenoxy)phosphonitrile (157.7 g.) solidified on cooling and melted at 102–103° C. (lit. 103–104° C.) after recrystallization from methanol; percent methoxyl: calc'd 21.32; found 20.60, 20.72.

A mixture of 8.7 g. (0.01 mole) of the trimeric bis(p-methoxyphenoxy)phosphonitrile previously prepared, 23 g. of hydrobromic acid (48 percent), and 75 ml. of glacial acetic acid were refluxed for three hours. The cooled product was poured into 600 ml. of water to give a milky emulsion which was extracted with 300 ml. of ether. The ether, in turn, was extracted with 500 ml. of 10 percent aqueous potassium hydroxide solution.

The base layer was acidified with hydrochloric acid and the precipitate taken up in ether. After several washings with water, the ether layer was dried and then stripped to 70° C. bottoms temperature at atmospheric pressure, and then at 70° C. bottoms temperature at water aspirator pressure. A yield of 6.4 g. of trimeric bis(p-hydroxyphenoxy)-phosphonitrile having the formula:

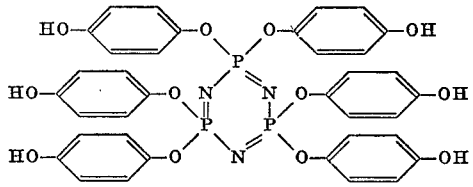

was obtained in the form of a dark brown viscous oil.

EXAMPLE II

Tetrameric bis(p-hydroxyphenyl)phosphonitrilate

A three liter three neck flask equipped with a stirrer, dropping funnel, azeotrope trap and condenser was charged with p-methoxyphenol (1.50 moles, 186.2 g.) potassium hydroxide (1.50 moles, 93.5 g.) and xylene (1000 ml.).

Heating and stirring were started, and when the temperature had reached about 80° C., phosphonitrilic chloride tetramer, $(PNCl_2)_4$, (0.15 moles, 69.5 g.) dissolved in 250 ml. of warm xylene was added via the dropping funnel during a period of 20 minutes. Refluxing was started and continued for 24 hours after water removal via the azeotrope trap had been completed. A total of 37 ml. of water was removed.

The cooled product was extracted with 10 percent aqueous potassium hydroxide and then washed with water to neutrality. The solvent was then stripped to 70° C. bottoms temperature at atmospheric pressure, then at 190° C. bottoms temperature at water aspirator pressure and finally at 160 C. bottoms temperature under high vacuum overnight. After filtration, the crude tetrameric bis(p-methoxyphenoxy)phosphonitrile product was obtained in an amount of 161.8 g. Percent methoxyl: calc'd 21.13, found 19.5 percent; percent phosphorus: calc'd 10.64, found 10.81; percent nitrogen: calc'd 4.81, found 4.71.

The thus-prepared tetrameric bis(p-methoxyphenoxy)-phosphonitrile (49.6 g.) was refluxed with hydrobromic acid (121.6 g.) and glacial acetic acid (600 ml.) at 110° C. for three hours. The cooled product was poured into 2400 ml. of water and extracted with 1200 ml. of ether. The ether layer was extracted with 10 percent aqueous potassium hydroxide (2 ltr.). The aqueous base layer was acidified with hydrochloric acid and the reaction product which precipitated was extracted with 1500 ml. of ether. After washing the ether layer with 1 ltr. of 5 percent aqueous sodium bicarbonate, it was dried over anhydrous magnesium sulfate. Evaporation of the ether gave 33.7 g. of tetrameric bis(p-hydroxyphenoxy)phosphonitrile having the formula:

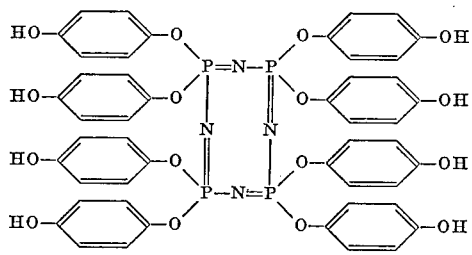

EXAMPLE III

Oxyethylated tetrameric bis(p-hydroxyphenoxy)phosphonitrile

A 500 ml. three neck flask, equipped with a magnetic stirrer, a Dry Ice cooled condenser with a regular condenser and drying tube in tandem, a jacketed dropping funnel and a thermometer, was utilized in this experiment. Ice water was pumped through the condenser and through the jacket of the dropping funnel and a nitrogen atmosphere was maintained in the reactor during this experiment.

Tetrameric bis(p-hydroxyphenoxy)phosphonitrile (19.8 g.) diethylcarbitol (100.0 g.), and potassium hydroxide pellets (1.5 g.) were charged to the reaction flask. While the temperature was maintained at 140–160° C., 99.0 g. of ethylene oxide was added via the dropping funnel over a period of about six hours.

Heating and stirring were continued for an additional period of 0.5 hour after which the product was cooled. An acid-type clay (Attaclay) was then added and the product heated to 180° C. at water aspirator pressure for 0.5 hour. After filtration, the yield of oxyethylated product was 109.7 g.

By analysis it was determined that the average number of moles of ethylene oxide added per OH group of the initially charged tetrameric bis(p-hydroxyphenoxy)phosphonitrile was 13.6.

EXAMPLE IV

Oxyethylated trimeric bis(p-hydroxyphenoxy) phosphonitrile

A 500 ml. multiple neck flask, equipped with a magnetic stirrer, thermometer, efficient condenser with a Dry Ice condenser on top, and a jacketed dropping funnel, was charged with trimeric bis(p-hydroxyphenoxy)phosphonitrile (9.3 g., 0.01175 mole), diethyl carbitol (50 g.) and potassium hydroxide pellets (0.5 g.). A dry nitrogen atmosphere was maintained over the reaction mixture throughout the run and water was excluded by connecting a drying tube to the top of the Dry Ice condenser. Ice water was pumped through the jacketed funnel and through the condenser.

Heating and stirring were started and when a temperature of about 160° C. had been reached, ethylene oxide (49.5 g., 1.125 moles) was added over a period of 4.5 hours, the temperature being maintained between 130 and 165° C. After the ethylene oxide addition had been completed, the reaction mixture was heated for 1 hour at 160° C. An acid-type clay (5.0 g.) was added to the product to remove the potassium hydroxide and the mixture was stirred in vacuo at about 10 mm. Hg at 180° C. bottoms temperature for 0.5 hour. After filtration through a filter aid, the residual solvent was stripped to 225° C. bottoms temperature at water aspirator pressure. The oxyethylated trimeric bis(p-hydroxyphenoxy)phosphonitrile product was thus obtained in an amount of 50.5 g.

By analysis it was determined that the average number of moles of ethylene oxide added per OH group of the originally charged trimeric bis(p-hydroxyphenoxy)phosphonitrile was 13.2.

EXAMPLE V

Reaction of trimeric bis(p-hydroxyphenoxy)phosphonitrile with glycidol

A 100 ml. three neck flask, fitted with thermometer, condenser with drying tube, dropping funnel and stirrer, was charged with 24.8 g. (0.0314 mole) of trimeric bis(p-hydroxyphenoxy)phosphonitrile and 1.0 g. of potassium hydroxide. Heating was commenced and when the temperature reached 105° C., glycidol (41.7 g., 0.564 mole) was added slowly via the dropping funnel. The temperature in the pot ranged from 90 to 210° C., but generally was maintained between 125 and 175° C. After the glycidol addition had been completed, the reaction mixture was maintained at 125° C. for 0.5 hour following which 10 g. of an acid-type clay (Attaclay) was added and the mixture was heated to 160° C. at water aspirator pressure for 0.5 hour. After filtration through filter aid the glycidol derivative was recovered in an amount of 40.5 g.

By analysis it was shown that the average number of glycidol units added per hydroxy group of the initially charged trimeric bis(p-hydroxyphenoxy)phosphonitrile was 1.125.

EXAMPLE VI

Reaction of tetrameric bis(p-hydroxyphenyl)phosphonitrilate with glycidol

A 100 ml. three neck flask, equipped with a magnetic stirrer, condenser with drying tube, dropping funnel and thermometer, was charged with 24.8 g. of tetrameric bis (p-hydroxyphenoxy)phosphonitrile and 1.0 g. of potassium hydroxide. Heating and stirring were started and when the temperature had reached 105° C., glycidol (41.7 g. was added via the dropping funnel, the temperature being maintained at about 125° C. during the addition. The product was stirred for 0.5 hour at 125° C. after the addition of glycidol had been completed. An acid-type clay (5 g.) was added and the mixture was heated and stirred at 150° C. at water aspirator pressure for 0.5 hour. The yield of the glycidol reaction product recovered by filtration, was 38.9 g.

Analysis of the product indicated that the average number of glycidol units added per hydroxy group of the initially charged phosphonitrile was 1.01.

Compounds of the type I are useful as chemical intermediates and as monomers. As shown in Examples III, IV, V and VI, these materials can be oxyalkylated with an alkylene oxide or a hydroxyalkylene oxide to yield polyols which are useful as base stock fluids for the preparation of valuable water-base hydraulic fluids. Physical properties of formulations with water prepared from the products of Examples III, IV and VI are given in the following table. The fluid formulations prepared using the products of this invention exhibit a high degree of fire resistance, they remain fluid at low temperature and are suitable for use as hydraulic fluids in a wide variety of industrial applications.

What is claimed is:
1. A cyclic polymeric substituted-phosphonitrile compound of the formula:

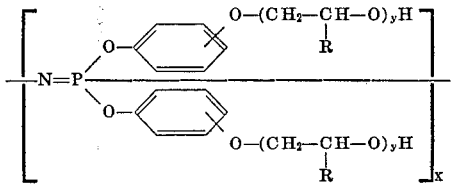

wherein $x$ is an integer of from 3 to 7, $y$ is a number of about 1 to about 40, and R is selected from the group consisting of H, $CH_3$ and $CH_3$—$CH_2$ and $CH_2$—OH.

2. The compound of claim 1 wherein $x$ is 3, and R is H.
3. The compound of claim 1 wherein $x$ is 4, and R is H.
4. The compound of claim 1 wherein $x$ is 3 and R is $CH_2$—OH.
5. The compound of claim 1 wherein $x$ is 4, and R is $CH_2$—OH.

TABLE.—FLUID FORMULATIONS WITH OXYALKYLATED PRODUCTS

| | Fluid formulation | | | |
|---|---|---|---|---|
| | Composition | | Physical properties | |
| Product of Example | Phosphonitrile compound (percent by weight) | Water (percent by weight) | Kinematic viscosity at 150° C. | Kinematic viscosity at 25° C. |
| (III) (x=4; 13.6 moles ethylene oxide/OH group) | 80.0 | 20.0 | 28.0 | 3,019 |
| (IV) (x=3; 13.2 moles ethylene oxide/OH group) | 82.5 | 17.5 | 26.2 | 1,992 |
| (VI) (x=4; 1.01 moles glycidol/OH group) | 66.7 | 33.3 | 32.3 | 10,975 |

References Cited

FOREIGN PATENTS 162,532   5/1964   U.S.S.R.

CHARLES B. PARKER, Primary Examiner

ANTON H. SUTTO, Assistant Examiner

U.S. Cl. X.R.

252—78; 260—968, 973